June 9, 1942.  E. VENABLE  2,285,633

RELAY

Filed July 26, 1939

Zinc oxide in acetone

WITNESSES:

INVENTOR
Emerson Venable.
BY
Ezra W. Savage
ATTORNEY

Patented June 9, 1942

2,285,633

UNITED STATES PATENT OFFICE 2,285,633

RELAY

Emerson Venable, Wilkinsburg, Pa., assignor to Westinghouse Electric & Manufacturing Company, East Pittsburgh, Pa., a corporation of Pennsylvania Application July 26, 1939, Serial No. 286,628

11 Claims. (Cl. 201—63)

The invention relates, generally, to protective apparatus for electrical systems and, more particularly, to electrical equipment of the type which contains dielectrics.

The object of the invention is to provide for utilizing the gases evolved by the electrical decomposition of a dielectric to produce a chemical action in a material to change its electrical characteristics to effect the operation of protective apparatus.

Other objects of the invention will, in part, be obvious and, in part, appear hereinafter.

The invention accordingly is disclosed in the accompanying drawing and comprises the features of construction, combination of elements and arrangement of parts which will be exemplified in the structure hereinafter set forth and the scope of the application of which will be indicated in the claims.

Figure 1:
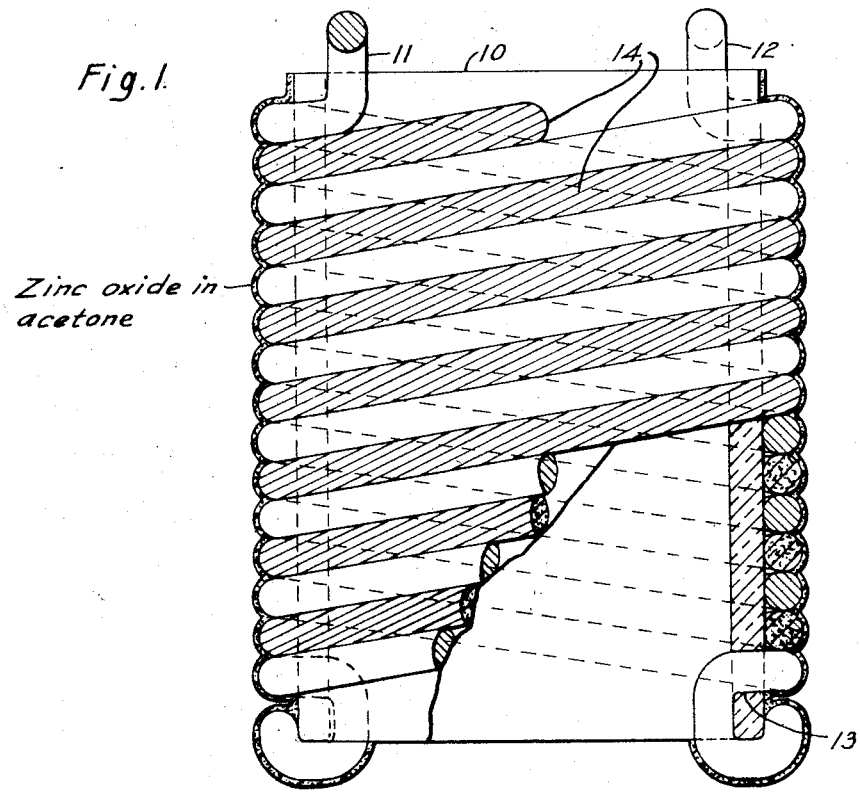
Figure 2:
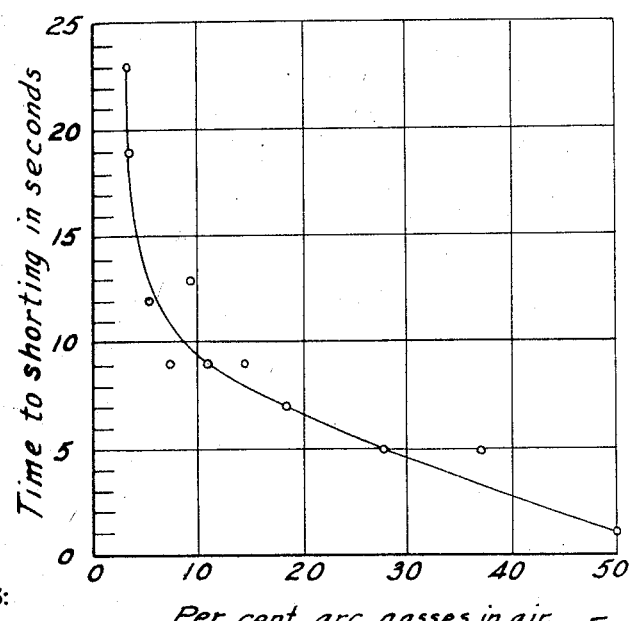

For a fuller understanding of the nature and objects of the invention, reference may be had to the following detailed description taken in connection with the accompanying drawing, in which:

Figure 1 is a view in side elevation of a protective device constructed in accordance with this invention, parts being broken away to show the details of the structure; and Fig. 2 is a curve showing the relation between the gas evolved and the time of operation of the protective apparatus.

It has now become common practice in certain installations of transformers, regulators and other electrical apparatus to use non-inflammable dielectrics. These dielectrics are generally chlorinated materials which, when decomposed by an electric arc, evolve hydrogen and chlorine which combine to form hydrochloric acid gas. An example of a dielectric which, on decomposition, gives hydrogen and chlorine is a dielectric comprising ethyltetrachlorbenzene, ethylpentachlorbenzene and chlorinated diphenyl.

Referring now to the drawing, and Fig. 1 in particular, an insulator 10 simulating a drum or spool is provided for carrying a plurality of electrodes. The drum or spool may be made of any suitable material such, for example, as porcelain, wood, or any of the other insulating materials well known in the art. If the application of a protective device requires it, the spool may be made with helical grooves for receiving the electrodes. This will prevent them from being displaced or moved into contact with one another.

In the particular embodiment of the invention shown, the spool 10 is not provided with grooves but is more in the nature of a plain drum of porcelain. Two copper wires 11 and 12 are wound helically on the drum 10 in spaced relation, as illustrated. In order to retain the copper wires in position in the drum, openings in the drum wall, as shown at 13, are provided through which the ends of the wires are threaded. The lower ends of the wires are turned about the lower edge of the drum in order to positively retain them in position. The upper ends of the wires are turned upwardly to present terminals or the making of electrical connections.

In the embodiment of the invention illustrated, a cotton cord 14 is wound on the drum 10 between the wires 11 and 12. In this manner, the wires or electrodes 11 and 12 are retained in spaced relation. The cotton cord or insulating member 14 serves another purpose which will be described hereinafter.

The unit so far described comprises two spaced electrodes 11 and 12 with an insulating member 14 disposed between the electrodes. To this unit is applied a material which, as applied, offers a high ohmic resistance to the flow of electric current from one electrode to the other, but which will react with the gases evolved by the electrical decomposition of the dielectric producing a material which is a good conductor and which serves to electrically connect one electrode to the other.

In this connection, zinc oxide has been found to be a highly satisfactory material to apply. In practice, zinc oxide in suspension in acetone has been applied to the unit with good results. The zinc oxide, as applied, offers a high resistance to the flow of electric current from one electrode to the other. The specific mixture employed comprises 40 grams of zinc oxide in 120 cubic centimeters of acetone.

In applying the mixture of zinc oxide, since it settles rapidly in acetone, it is necessary to keep the mixture continuously agitated during the process of application. The application of the zinic oxide in suspension in acetone may be effected by the use of a brush or the like. After an application has been made, it should be dried for about one-half hour at a temperature of from 80° C. to 90° C. Care should be taken to use a good grade of zinc oxide and it is pointed out that either Baker's analyzed or U. S. P. grade zinc oxide has been found satisfactory for coating purposes.

In building the protective unit, a cotton cord 14 was disposed between the electrodes 11 and 12. In addition to spacing the electrodes, the cord is found to be helpful, in retaining the zinc oxide on the unit. Units have been built without a cotton cord and the zinc oxide applied directly to the insulator. In those units which were not provided with a cotton cord, the zinc oxide rubbed off or was rendered less efficient in use to the zinc oxide applied to units having a cotton cord. However, it is to be understood that in the units in which the zinc oxide is applied directly to the insulator or spool 10, satisfactory operation was obtained.

It has been found in practice that the spacing of the electrodes depends upon the voltage of the circuits across which the unit is to be connected. Units for use on 220 volt systems should have a spacing of .05 inch between the electrodes while for 110 volt systems, a spacing of .02 inch is sufficient. The proper spacing can be provided for by the correct grooving of the spool 10 or by the insertion of a cotton thread of the proper size.

It has been found that when the unit coated with zinc oxide is wet with a dielectric comprising ethyltetrachlorbenzene, ethylpentachlorbenzene, chlorinated diphenyl and a small amount of trichlorbenzene that the resistance of the zinc oxide between the electrodes is increased. Tests reveal that when the unit is connected across a 220 volt system, the breakdown strength between an electrode spaced .05 inch was 2900 volts when wet with Inerteen and only 1900 volts when dry. Units in which the electrodes are spaced .02 inch have a breakdown strength of 1300 volts when wet with the above-described dielectric and 980 volts when dry.

These units have been found to be very sensitive. The sensitivity is best described in the curve of Fig. 2. In obtaining the values to plot this curve, a 220 volt unit was tested in various concentrations of arc gases in air. In referring to the curve, it will be found that a 220 volt unit, when exposed to about 9% of arc gases in air, will function in 10 seconds. In other words, when the zinc oxide is exposed to a mixture of 9% arc gases in air, chemical change will be effected to such an extent that current will flow in sufficient quantity to operate protective devices such as circuit breakers or the like, to disconnect the electrical apparatus to be protected from the circuit in which it operates.

The method of connecting the protector device for protecting a transformer or the like will not be described in detail herein, since any one skilled in the art will be able to properly apply the protector device. It is pointed out that it may be connected in a circuit in the manner illustrated and described in Patent No. 2,175,893, issued to Charles F. Hill October 4, 1939.

In order to improve the adhesion of the oxide, it has been embodied in a lacquer and applied to the unit. While the lacquer will increase the adhesion, it renders the unit less sensitive. The sensitivity of the oxide carried by the lacquer may be increased by adding metal and other powders. A good measure of success was obtained by using aluminum and copper powders and graphite. However, all these powders lower the breakdown strength.

In addition to zinc oxide, other oxides have been found satisfactory. Manganese oxide, iron oxide, cobalt oxide, nickel oxide, copper oxide, molybdenum oxide, cadmium oxide and tin oxide have been used with success. A shorter way to describe the oxides that have been successful is to say that any oxide of a metal selected from the groups having an atomic number ranging from 24 to 30, inclusive, and from 42 to 48, inclusive, have proved to be successful. These oxides may be applied by putting them in suspension in acetone or other similar carrier which is well known to the art. The sensitivity of these oxides will vary but all of them have been used successfully.

In conclusion, it is pointed out that while the illustrated example constitutes a practical embodiment of my invention, I do not limit myself to the exact details shown, since modifications of the same may be considerably varied without departing from the spirit of the invention as defined in the appended claims.

I claim as my invention:

1. In electrical apparatus provided with a dielectric containing a halogenated compound which when decomposed by an electric arc evolves an acidic gas which reacts with a metallic oxide, in combination, a plurality of spaced electrodes, an oxide of a metal selected from the groups having an atomic number ranging from 24 to 30, inclusive, and from 42 to 48, inclusive, disposed to connect the electrodes to one another, the metallic oxides having high ohmic resistance to the flow of electric current and capable of reacting with the evolved acidic gas to produce a material which is a good conductor of electricity.

2. In electrical apparatus provided with a dielectric containing a halogenated compound which when decomposed by an electric arc evolves an acidic gas which reacts with a metallic oxide, in combination, a plurality of spaced electrodes, a zinc oxide disposed to connect the electrodes to one another, the zinc oxide having high ohmic resistance to the flow of electric current and capable of reacting with the evolved acidic gas to produce a material which is a good conductor of electricity.

3. In electrical apparatus provided with a dielectric containing a halogenated compound which reacts with a metallic oxide, in combination, a plurality of spaced electrodes, an insulator carrying the electrodes, an oxide of the metal selected from the groups having an atomic number ranging from 24 to 30, inclusive, and from 42 to 48, inclusive, disposed to connect the electrodes to one another, the metallic oxide having high ohmic resistance to the flow of electric current whereby the electrodes are insulated from one another, the metallic oxides being capable of reacting with the evolved acidic gas to produce a material which is a good conductor of electricity, thereby establishing an electrical connection between the electrodes to facilitate the flow of current.

4. In a protective device for electrical apparatus provided with a dielectric containing a halogenated compound which when decomposed by an electric arc evolves an acidic gas which will react with a metallic oxide, in combination, a carrier made from an insulating material, a plurality of electrodes disposed on the carrier in spaced relation and connected in circuit relation with the electrical apparatus, an insulating member disposed on the carrier between the electrodes to keep them in spaced relation, and an oxide comprising one or more of the metallic oxides selected from the groups having an atomic number ranging from 24 to 30, inclusive, and from 42 to 48, inclusive, disposed to connect the electrodes to one another, the metallic oxides having high ohmic resistance to the flow of electric current and being capable of reacting with the evolved acidic gases to produce a material which is a good conductor of electricity.

5. In a protective device for electrical apparatus provided with a dielectric containing a halogenated compound which when decomposed by an electric arc evolves an acidic gas which will react with a metallic oxide, in combination, an insulating member, a plurality of spaced electrodes disposed on the insulating member and connected in circuit relation with the electrical apparatus, and one or more of the metallic oxides comprised in the groups having an atomic number ranging from 24 to 30, inclusive, and from 42 to 48, inclusive, disposed to connect the electrodes to one another, the metallic oxide applied having high ohmic resistance to the flow of electric current and being capable of reacting with the evolved acidic gas to produce a material which is a good conductor of electricity.

6. In a protective device for electrical apparatus provided with a dielectric containing a halogenated compound which when decomposed by an electric arc evolves an acidic gas which will react with a metallic oxide, in combination, a plurality of spaced electrodes connected in circuit relation with the electrical apparatus to be protected, and an oxide selected from the group of metallic oxides having an atomic number ranging from 24 to 30, inclusive, and from 42 to 48, inclusive, mixed with a metallic powder, the mixture being disposed to connect the electrodes to one another, the metallic powder being used only in sufficient quantity to render the mixture sensitive when an acidic gas acts upon the metallic oxides but without reducing the ohmic resistance of the mixture so as to result in breakdown under the normal voltage imposed on the electrical apparatus.

7. In electrical apparatus provided with a dielectric containing a halogenated compound which when decomposed by an electric arc evolves an acidic gas which reacts with the metallic oxide, in combination, an insulator, a plurality of spaced electrodes disposed on the insulator, an insulating member disposed on the insulator between the electrodes, a metallic oxide selected from the groups of oxides, the metals of which having an atomic number ranging from 24 to 30, inclusive, and 42 to 48, inclusive, and a metal powder mixed with the metallic oxide, the mixture being applied to the insulator and disposed to connect the electrodes to one another, the metallic oxide having high ohmic resistance to the flow of electric current, the metal powder being employed in sufficient quantity to give the metallic oxide sensitivity without rendering it liable to breakdown under the voltages applied to the electrical apparatus, the metallic oxide being capable of reacting with the evolved acidic gas to produce a material which is a good conductor of electricity.

8. In electrical apparatus provided with a dielectric containing a halogenated compound which when decomposed by an electric arc evolves an acidic gas which reacts with a metallic oxide, in combination, an insulator, a plurality of spaced electrodes wound on the insulator, an insulating member wound on the insulator between the electrodes, an oxide of a metal selected from the groups of metals having an atomic number from 24 to 30, inclusive, and 42 to 48, inclusive, a liquid in which the metallic powder and metallic oxide are held in suspension, the materials in suspension being applied to the electrodes and insulating member, the oxide having high ohmic resistance to the flow of electric current and capable of reacting with the evolved acidic gas to produce a material which is a good conductor of electricity the metal powder being employed in sufficient quantity to give the metallic oxide sensitivity without rendering it liable to breakdown under the voltages applied to the electrical apparatus.

9. In a protective device for electrical apparatus provided with a dielectric containing a halogenated compound which when decomposed by an electric arc evolves an acidic gas which will react with a metallic oxide, in combination, a carrier of insulating material, the carrier having a plurality of grooves therein extending helically around it, a plurality of conductors wound on the carrier in said grooves in spaced relation, an insulating member wound on the carrier in a helical groove between the conductors, an oxide of a metal selected from the groups having an atomic number ranging from 24 to 30, inclusive, and from 42 to 48, inclusive, disposed to bridge the electrodes, the metallic oxides having high ohmic resistance to the flow of electric current and capable of reacting with the evolved acidic gas to produce a material which is a good conductor of electricity.

10. In a protective device for transformers provided with a dielectric comprising a halogenated compound which when decomposed by an electric arc evolves an acidic gas which will react with a metallic oxide and protective switches, in combination, a carrier made from an insulating material, a plurality of electrodes disposed on the carrier in spaced relation, the electrodes being connected in circuit relation with the transformer and an oxide comprising one or more of the metallic oxides selected from the groups having an atomic number ranging from 24 to 30, inclusive, and from 42 to 48, inclusive, disposed to connect the electrodes to one another, the metallic oxides having a high ohmic resistance to the flow of electric current and being capable of being reacted with the evolved acidic gases to produce a material which is a good conductor of electricity to permit current flow in the electrode circuit to effect the operation of a protective switch.

11. In a protective device for electrical apparatus provided with a dielectric comprising a halogenated compound which when decomposed by an electric arc evolves an acidic gas which will react with the metallic oxide, in combination, a carrier made from an insulating material, the carrier having grooves therein, a plurality of conductors disposed in the grooves, the conductors being adapted for use as electrodes, the grooves serving to retain the conductors in spaced relation, the electrodes being connected in circuit relation with the electrical apparatus, an oxide of a metal selected from the groups having an atomic number ranging from 24 to 30, inclusive, and from 42 to 48, inclusive, disposed to bridge the conductors, the metallic oxides having high ohmic resistance to the flow of electric current and capable of reacting with the evolved acidic gas to produce a material which is a good conductor of electricity whereby current will flow in the electrode circuit.

EMERSON VENABLE.